United States Patent [19]

Astheimer et al.

[11] 4,063,093
[45] Dec. 13, 1977

[54] INFRARED VIDICON SYSTEM

[75] Inventors: Robert W. Astheimer, Westport; Gerald Falbel, Stamford, both of Conn.

[73] Assignee: Barnes Engineering Company, Stamford, Conn.

[21] Appl. No.: 743,552

[22] Filed: Nov. 22, 1976

[51] Int. Cl.² ............................................. H01J 31/49
[52] U.S. Cl. .................................. 250/330; 250/333; 250/342
[58] Field of Search ................ 250/330, 334, 342, 333

[56] References Cited

U.S. PATENT DOCUMENTS

| 3,239,672 | 3/1966 | Gabloffsky | 250/342 |
| 3,774,043 | 11/1973 | LeCarvennec | 250/334 |

Primary Examiner—Harold A. Dixon
Attorney, Agent, or Firm—Joseph Levinson

[57] ABSTRACT

An infrared vidicon system having capacitive type target elements is provided with a means for modulating the target scene with a duty cycle of less than 50% and the reading of the target scene in a predetermined sequence when modulation is not being applied to the vidicon tube. The sequentially read target scene is stored and continuously played back to prevent flicker. This operation allows signal buildup, because the target scene is not discharged every frame.

This vidicon system also reduces the non-uniformity of responsivity across the surface of the target of the tube by illuminating the target by an adjustable uniform source of infrared radiation.

7 Claims, 4 Drawing Figures

INFRARED VIDICON SYSTEM

The invention herein described was made in the course of or under a contract or subcontract thereunder with the Department of the Army.

BACKGROUND OF THE INVENTION

This invention relates to infrared vidicon systems, and more particularly to systems of this type which utilize vidicon tubes having capacitive-sensitive target surfaces.

All capacitive vidicon image tubes, for example one having a pyroelectric target surface, require some type of optical modulation of the infrared scene in order to produce a visible picture. This is the case because of the target area of the infrared vidicon tube, which is a series of capacitors which inherently cannot provide a DC response due to charge leakage. The optical modulation may be provided by panning the pyroelectric vidicon camera over the scene, by nutating the camera lens, or by chopping the scene, using a conventional radiation chopper.

Panning or nutating the camera over the scene produces thermal lag on the pyroelectric vidicon sensitive surface which produces undesirable image "ghosts" or "tails" trailing behind the image in the direction of the panning or nutating. This can be overcome, for stationary objects only, by utilizing chopping means with a 50% duty cycle. Moving targets in a 50% duty cycle chop system, however, exhibit increased signal which introduces errors where absolute radiometric signal readout is required. Another disadvantage of the 50% duty cycle chop system is that such a system inherently generates only about one half of the signal that the systems utilizing panning or nutating provide.

Another problem associated with capacitive target element vidicons such as pyroelectric vidicons is the lack of uniform responsivity across the capacitive elements or sensitive target area of the vidicon tube.

It is an object of this invention to provide a new and improved infrared vidicon system which overcomes some of the disadvantages associated with such systems.

A further object of this invention is to provide an improved infrared vidicon system having greater signal output than conventional chopped systems of this type, while overcoming the disadvantages of the systems using panning or nutating for modulating the scene.

A further object of this invention is to provide a new and improved vidicon system which produces quantitative data with respect to the temperature of an object in the field of view of the system.

SUMMARY OF THE INVENTION

In carrying out this invention in one illustrative embodiment thereof, an infrared vidicon system is provided having a vidicon image tube with a capacitive type target. Chopper means are provided for modulating the radiation applied to the vidicon target from the scene with a duty cycle of less than 50%. The read beam of the vidicon image tube is cut off for a predetermined number of frames to allow the charge on the target of the vidicon tube to build up and then be read off in a single frame and stored. A display monitor is provided and the single frame is continuously played back on the display monitor when the chopper means is closed and the beam is not reading signal from the vidicon target. In a further aspect of the invention, a source of radiation is used to flood the vidicon tube when the chopper means is closed in order to limit responsivity variations across the vidicon target.

DESCRIPTION OF THE PREFERRED EMBODIMENTS

Figure 1:
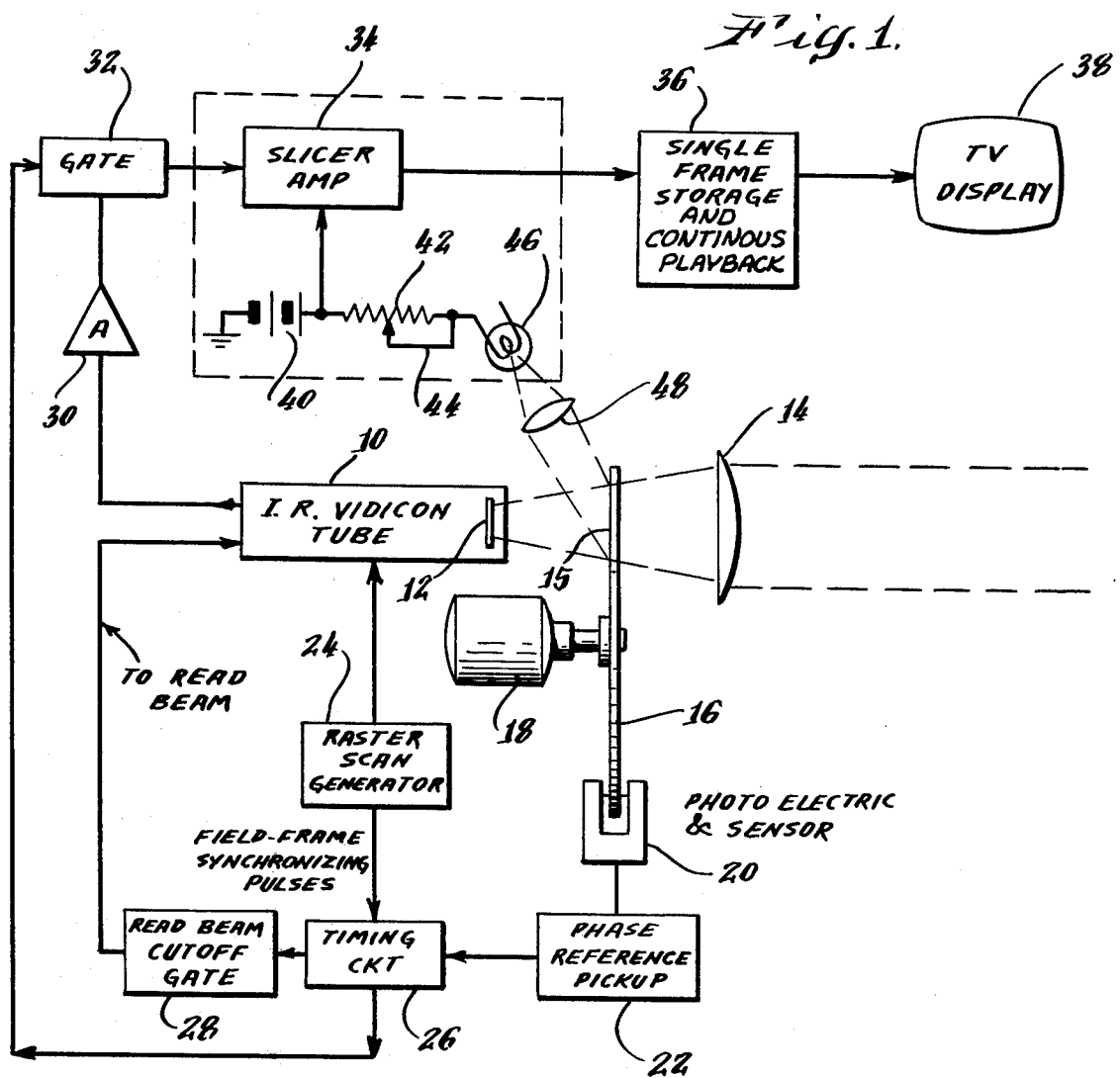
FIG. 1 is a block diagram of the infrared vidicon system embodied in the present invention.

Referring now to the block diagram shown in FIG. 1, a lens 14 applies radiation from a field of view or target scene to the sensitive or target area 12 of a vidicon tube 10. The vidicon tube 10 is an infrared sensitive camera tube, the structure of which is similar to that of a conventional vidicon but which differs therefrom in that the target or sensitive area 12 is made up of a capacitive type sensitive surface which is equivalent to a series of capacitors which charge up in accordance with the radiation applied from the target scene. One form of capacitive element tube is the pyroelectric vidicon tube having a sensitive surface comprised of a thin wafer of pyroelectric material. The operation of the pyroelectric vidicon tube is based on the pyroelectric effect in the thin wafer of pyroelectric material. The variation of the electrical polarization of each pyroelectric detector element with temperature is manifested as a distribution of surface charges proportional to the quantity of heat absorbed from the target scene. The neutralization of the surface charges by the scanning electron beam of the tube gives rise to the signal current. Although the invention is not considered limited to any particular capacitive type vidicon tubes, examples of pyroelectric vidicon tubes suitable for the present application would include the Pyrocon TH8X40 made by Thompson CFS, and P-8090 manufactured by English Electric Valve Co. Ltd.

Figure 2:
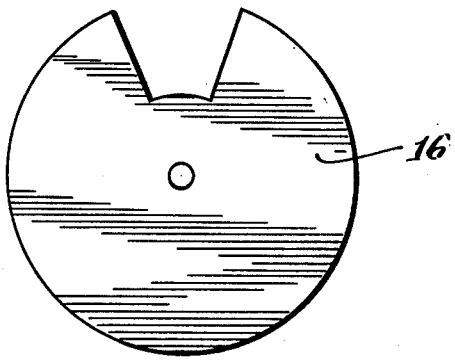
FIG. 2 illustrates one type of chopper which may be utilized in the system shown in FIG. 1.

The vidicon tube 10 is provided with a raster scan generator 24 for scanning the read beam over the target 12, for obtaining the signal generated by the target scene. Since the vidicon tube 10 has a sensitive surface which is capacitive in nature and responds to charge, it inherently cannot provide a DC response and requires some form of modulation of the target scene. A chopper 16 is provided for this purpose, which is driven by a chopper motor 18. As will be seen in FIG. 2, one form of chopper suitable for the present invention is shown. As will be apparent from the figure, the open portion of the chopper represents a less than 50% duty cycle, and preferably would be less than 30%, which is illustrated in FIG. 2. The chopper is provided with a photoelectric sensor 20 for providing reference pulses when the chopper has an open sector. Photoelectric sensor 20 is connected to a phase reference pickup 22 which feeds a timing circuit 26. The timing circuit 26 is coupled to the raster scan generator 24 of the pyroelectric vidicon tube 10, for obtaining therefrom field frame synchronizing pulses. The timing circuit 26 feeds a read beam cutoff gate 28 which in turn is coupled to the gun of the pyroelectric vidicon tube 10 for controlling the on-off cycle of the read beam. The operation of this portion of the circuitry, as well as the timing sequence, will be covered in more detail hereinafter.

The output of the vidicon tube 10 is applied through an amplifier 30 to a gate 32 which is also coupled to the timing circuit 26. The output of the gate 32 is applied through a slicer amplifier 34 which may or may not be utilized as discussed hereinafter, and from the slicer 34 to a single-frame storage means 36. The single frame storage means 36 may be a conventional video storage disc, which is preferred, or any other suitable means, such as a PEP-400 lithicon scan converter. The function of the single frame storage is to store a single frame picture from the vidicon tube 10 which is applied to a TV display or monitor 38, and is played back continuously.

Attached to the slicer 34 is a potentiometer 42 having a battery 40 connected to ground on one end thereof, and a variable tap 44 connected to a source of illumination in the form of a lamp 46. A lens 48 applies the illumination from the lamp 46 to the sensitive or target area 12 of the vidicon tube 10 via the mirrored side 15 of the chopper 16.

Figure 3:
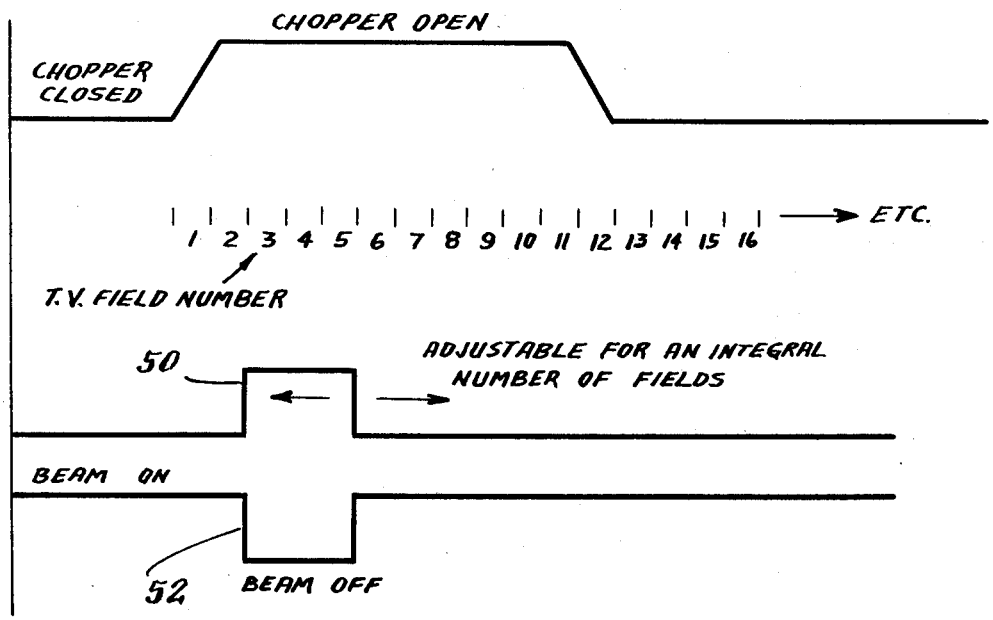
FIG. 3 shows a plurality of wave forms useful in explaining the operation of the system of FIG. 1, particularly with respect to the gating of the read beam of the vidicon tube.

As has been pointed out, since the vidicon tube 10 has no DC response, the radiation applied thereto must be either chopped or panned. Panning or nutating produces smears of comet tails which make the apparent brightness of the tube depend upon the object's size and aspect, while chopping produces objectionable flicker and phase reversals. In the present system, the radiation applied to the pyroelectric vidicon tube 10 is chopped, using an open-opaque chopper 16 with a low duty cycle, which is less than 50% open, and preferably less than 30% open. The minimum absolute chopper open time should be at least one TV frame, which would be 1/30 of a second. As will be seen on the wave forms of FIG. 3, with the chopper open a phase reference pickup waveform is generated by the photosensor 20 and the phase reference pickup 22, and produced by the timing circuit 26. The phase reference pickup waveform indicated as waveform 50 in FIG. 3 is triggered after a predetermined number of TV fields are generated while the chopper is open, and the signal is adjustable for an integral number of TV fields. The signal represented by waveform 50 is applied to the read beam cutoff gate 28 to cut the beam off and allow the charge to build up on the vidicon sensitive area 12 which is represented by the signal 52 from the read beam cutoff gate 28, which is applied to the pyroelectric vidicon tube 10. At the end of each signal 50, the beam is turned on and scans the target area 12 to complete a single raster scan, which is stored on the single frame storage means 36 in the form of a video disc storage means or a solid state storage means, and is played back continuously at the standard TV frame rate on the monitor 38. As will be observed from the waveforms on FIG. 3, the system does not read out every TV field or frame during the chopper open time, but in effect allows the temperature represented by charge on each pyroelectric element on the target sensitive area 12 of the vidicon tube 10 to build up for multiple TV fields or frames, which result in a higher charge which is read off by the electron beam in a single field once the read beam is switched on. This single frame is stored by the single frame storage means 36, and is played back continuously at standard TV frame rates on the display monitor 38 for the period that the chopper is closed. The single frame storage means is continually updated when the next phase reference pickup signal 50 occurs, and the beam is turned back on again for scanning another frame.

Figure 4:
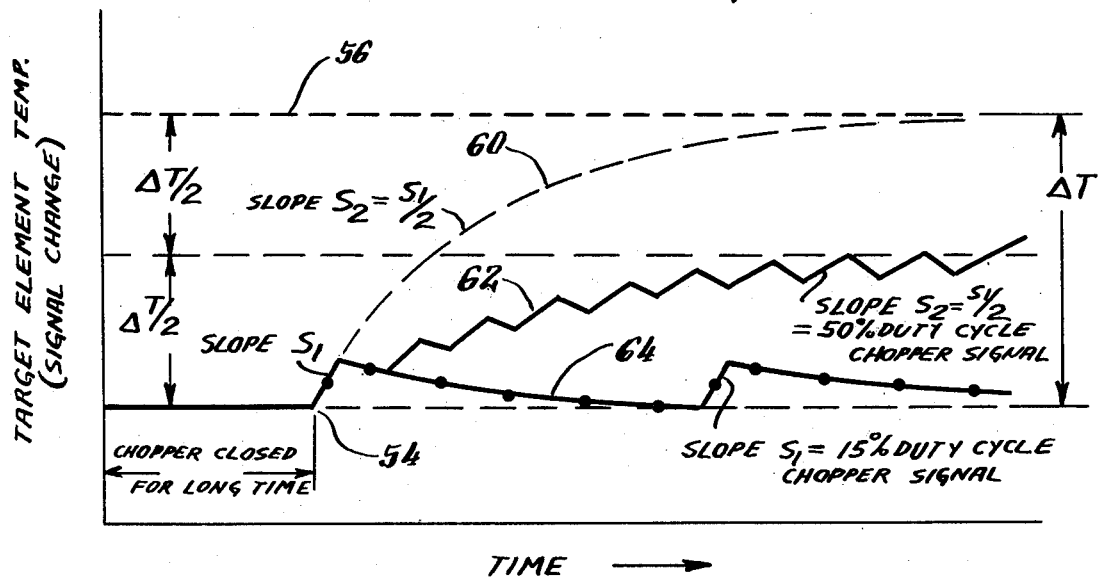
FIG. 4 shows a graph of vidicon-target element temperature vs. time which is useful in illustrating the signal advantage obtained in the present system vs. a 50% duty-cycle chopper in a conventional pyroelectric vidicon system.

The use of a low-duty cycle chopper relative to a 50% duty chopper or higher is illustrated in FIG. 4, which is a plot of target element temperature or signal charge vs. time. Line 54 represents the steady state target element temperature with the chopper closed, while line 56 represents the steady state target element temperature with the chopper open. Curve 60 indicates the thermal time response of a pyroelectric element after the chopper opens and stays open. Curve 62 represents a 50% duty cycle chopper waveform, while curve 64 represents a 15% duty cycle chopper waveform. Since the single shot transient temperature time history of each element in a pyroelectric vidicon target is essentially that of a single time constant exponential rise, the slope at the beginning of a low duty cycle chop is twice that of the repetitive slope of the 50% duty cycle chop. The signal readout by the electron beam in the vidicon tube 10 is the differential of this slope, which means that the signal obtained with the low duty cycle chop will be twice that of a 50% duty cycle chop, which is illustrated in FIG. 4.

The ability to measure absolute temperatures of objects of the scene with capacitive type vidicon tubes is limited by the responsivity variation across the sensitive surface 12 of the tube 10. This can be overcome by using the reflective surface 15 on the back of the chopper 16 and a lamp 46 as shown in FIG. 1, combined with a saturation amplifier or a slicer 34.

The vidicon tube can only read out positive charges on the target surface 12 which is discharged by electrons from the beam of the tube. When the chopper 16 opens, the charge distribution is positive for objects in the scene of higher radiance than the level to which the target 12 was exposed during the closed phase, and negative for objects of lower radiance levels. The latter will, therefore, fall below the black level and the display will only show objects warmer than some level as determined by the lamp power. A lamp is used rather than a black body to provide essentially instantaneous response. The current to the lamp 46 provided by a battery 40 may be manually set by a potentiometer 42 which may be calibrated in terms of equivalent temperature. Thus, by setting the tap 44 on the potentiometer 42, for example 75° C, the display 38 will show only objects warmer than the 75° temperature as white areas, and objects less than this temperature as black areas. In such a case the element 34 may merely be a saturation amplifier which shows full white for any signal above a preset threshold level. Alternately using a slicer for element 34, small incremental temperature slices, for example from 75° to 76°, can be displayed as white areas on the TV display 38, thus providing an absolute isothermal contour of the objects in the field of view of the vidicon tube 10. Accordingly, the white contour line exactly defines a known temperature of objects in the scene being observed by the vidicon tube 10.

The infrared vidicon system disclosed by the present invention thus provides an optimum means for modulating or chopping the scene in such a system to produce a picture which is free of flicker and without ghosts or tails trailing the image displayed on a monitor. By utilizing a low duty cycle chopping technique, and reading the target area of the tube during a preselected number of fields, a larger signal is obtained than would normally be obtained in conventional vidicon systems. Furthermore, the invention provides a means for obtaining absolute temperature information in an infrared vidicon system.

Since other modifications and changes, varied to fit particular operating requirements and environments, will be apparent to those skilled in the art, the invention is not considered limited to the examples chosen for purposes of disclosure, and covers all modifications and changes which do not constitute departures from the true spirit and scope of this invention.

What is claimed is:

1. An infrared vidicon system for providing an infrared picture of a target scene, comprising in combination
   a. a vidicon image tube having a capacitance type vidicon target,
   b. chopper means for modulating the radiation applied to said vidicon target, the duty cycle of said chopper means being less than 50%,
   c. storage means for storing the scene of a single frame of said vidicon image tube,
   d. a display monitor, and
   e. means for continuously playing back on said display monitor said single frame from said storage means.

2. The system set forth in claim 1 having means for cutting off the read beam of said vidicon image tube in a predetermined sequence to allow the charge on said capacitive type vidicon target to build up for multiple frames thereby resulting in a higher charge being read off by the read beam in a single frame when the read beam is turned on.

3. The system set forth in claim 2 wherein said frame is played back on said display monitor when said chopper means is closed and the read beam is not reading signal from said vidicon target.

4. The infrared vidicon system set forth in claim 1 including a source of radiation and means for uniformly irradiating the vidicon target plate with said source of radiation when said chopper means is blocking the radiation from the target scene to provide a reference radiation level for the measurement of absolute temperatures of objects in the scene.

5. The system set forth in claim 4 wherein the surface of the chopper facing said vidicon image tube is mirrored and said source of radiation is applied from the mirrored surface to the vidicon image tube when said chopper is closed.

6. The system set forth in claim 4 wherein said source of radiation may be varied in intensity to provide different reference levels.

7. The system set forth in claim 4 having means for cutting off the read beam of said vidicon image tube in a predetermined sequence to allow the charge on said capacitive type vidicon target to build up for multiple frames thereby resulting in higher charge being read off by the read beam in a single frame when the read beam is turned on.

* * * * *